(12) United States Patent
Lamb

(10) Patent No.: US 10,987,874 B2
(45) Date of Patent: Apr. 27, 2021

(54) HEAT STAKES

(71) Applicant: Ford Global Technologies, LLC, Dearborn, MI (US)

(72) Inventor: Daniel Lamb, Laindon (GB)

(73) Assignee: Ford Global Technologies, LLC, Dearborn, MI (US)

( * ) Notice: Subject to any disclaimer, the term of this patent is extended or adjusted under 35 U.S.C. 154(b) by 573 days.

(21) Appl. No.: 15/671,015

(22) Filed: Aug. 7, 2017

(65) Prior Publication Data

US 2018/0056597 A1     Mar. 1, 2018

(30) Foreign Application Priority Data

Aug. 26, 2016   (GB) ...................... 1614545

(51) Int. Cl.
| B32B 37/00 | (2006.01) |
| B29C 65/18 | (2006.01) |
| B29C 65/78 | (2006.01) |
| B29C 65/00 | (2006.01) |
| B29C 65/60 | (2006.01) |

(Continued)

(52) U.S. Cl.
CPC .............. B29C 65/18 (2013.01); B29C 65/06 (2013.01); B29C 65/601 (2013.01); B29C 65/602 (2013.01); B29C 65/7811 (2013.01); B29C 65/7841 (2013.01); B29C 65/7855 (2013.01); B29C 66/1122 (2013.01); B29C 66/21 (2013.01); B29C 66/41 (2013.01); B29C 66/81429 (2013.01); B29C 66/81431 (2013.01); B29C 66/8322 (2013.01); *B29C 65/48* (2013.01); *B29C 65/565* (2013.01); *B29C 65/606* (2013.01); *B29L 2031/3005* (2013.01)

(58) Field of Classification Search
CPC ....... B29C 65/18; B29C 65/06; B29C 65/601; B29C 65/602; B29C 66/1122; B29C 66/21; B29C 66/41; B29C 66/81429; B29C 66/81431; B29C 66/8322
USPC ........................................................ 156/73.5
See application file for complete search history.

(56) References Cited

U.S. PATENT DOCUMENTS

| 5,047,896 A | 9/1991 | Zust |
| 6,579,402 B1 | 6/2003 | Murar et al. |
| 7,567,313 B2 | 7/2009 | Goh et al. |
| 2011/0123755 A1* | 5/2011 | Brown .................. E06B 3/9608 |
| | | 428/58 |

(Continued)

FOREIGN PATENT DOCUMENTS

| CN | 1255835 A | 6/2000 |
| CN | 101901635 A | 12/2010 |

(Continued)

OTHER PUBLICATIONS

Great Britain Intellectual Property Office, Search and Examination Report Issued in Application No. GB1614545.0, dated Jan. 31, 2017, 8 pages.

(Continued)

*Primary Examiner* — James D Sells
(74) *Attorney, Agent, or Firm* — Geoffrey Brumbaugh; McCoy Russell LLP

(57) ABSTRACT

Apparatus configured to enable the staking of an interfacing part to a base is provided. The apparatus includes a retainer configured to convey a stake and the interfacing part to the base. The apparatus is further configured to provide a heat and/or vibration to effect the simultaneous attachment of the stake to the base and the interfacing part to the base.

19 Claims, 5 Drawing Sheets

(51) Int. Cl.
*B29C 65/06* (2006.01)
*B29C 65/56* (2006.01)
*B29L 31/30* (2006.01)
*B29C 65/48* (2006.01)

(56) References Cited

U.S. PATENT DOCUMENTS

| | | |
|---|---|---|
| 2011/0273876 A1 | 11/2011 | Stolyar et al. |
| 2013/0052025 A1 | 2/2013 | Agaram et al. |
| 2014/0219710 A1* | 8/2014 | Ezzat .................. B29C 65/30 403/270 |
| 2014/0230994 A1 | 8/2014 | Riehm |
| 2016/0061245 A1* | 3/2016 | Toyozumi ........... B29C 66/1122 411/82 |
| 2016/0116080 A1* | 4/2016 | Bouey .................. F16L 15/006 156/272.2 |

FOREIGN PATENT DOCUMENTS

| | | |
|---|---|---|
| CN | 103987972 A | 8/2014 |
| DE | 102011054358 A1 | 4/2013 |
| JP | S58153611 A | 9/1983 |
| JP | H02130130 A | 5/1990 |
| JP | 2014226698 A | 12/2014 |
| WO | 2009134458 A1 | 11/2009 |

OTHER PUBLICATIONS

National Intellectual Property Office of the People's Republic of China, Office Action and Search Report Issued in Application No. 201710739172.4, dated Aug. 31, 2020, 11 pages. (Submitted with Partial Translation).

* cited by examiner

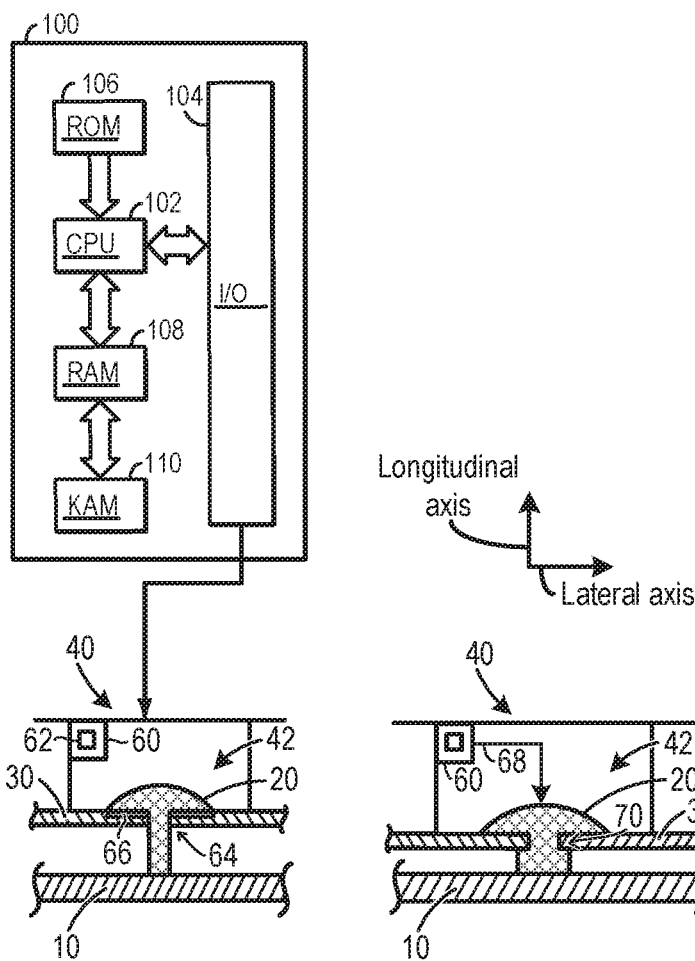
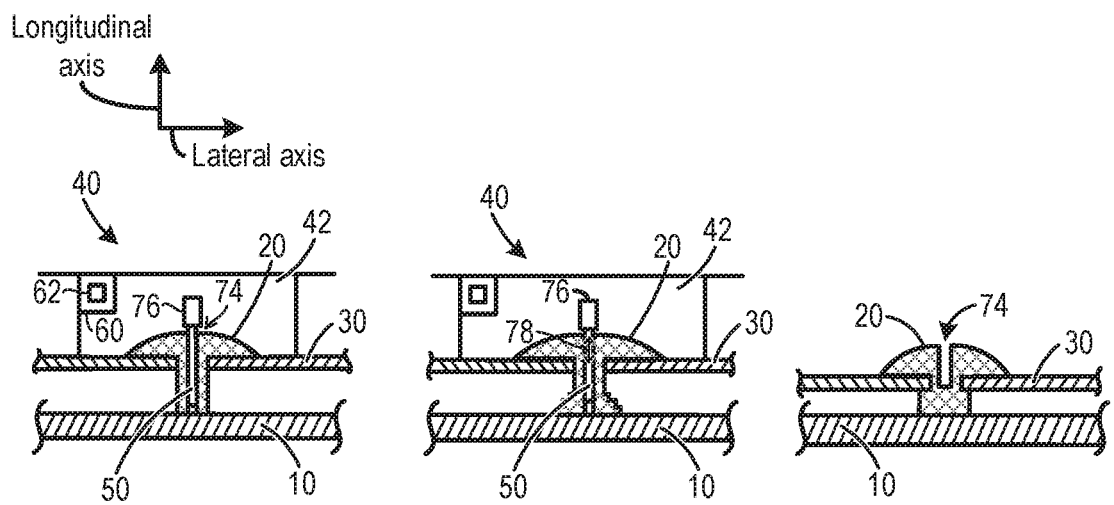
FIG. 3A  FIG. 3B  FIG. 3C
FIG. 4A  FIG. 4B  FIG. 4C

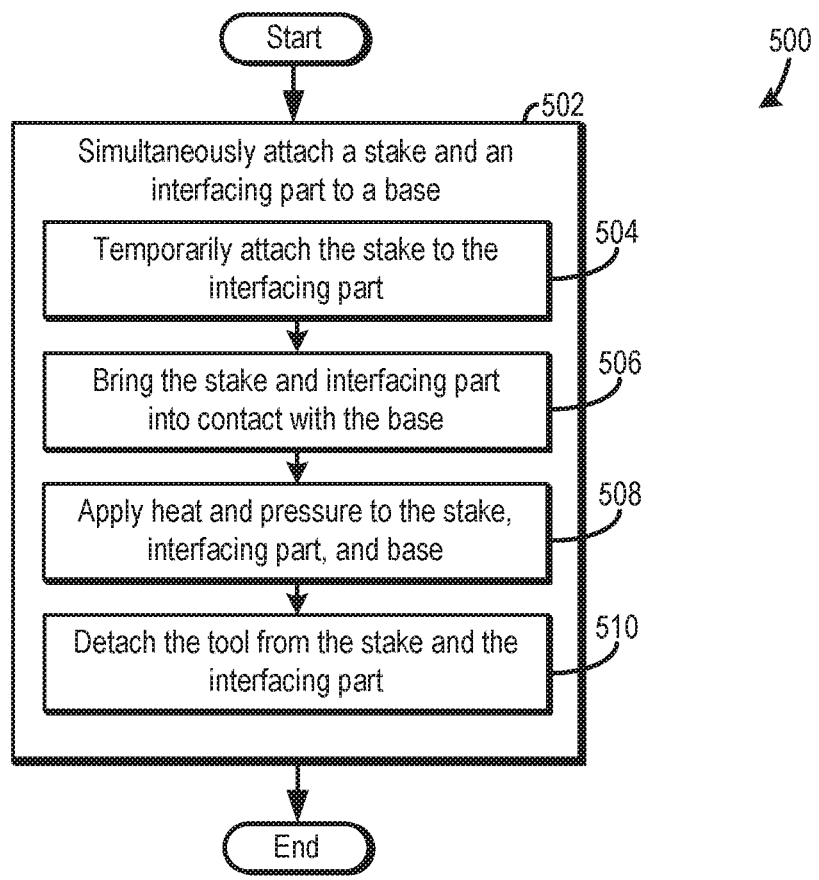

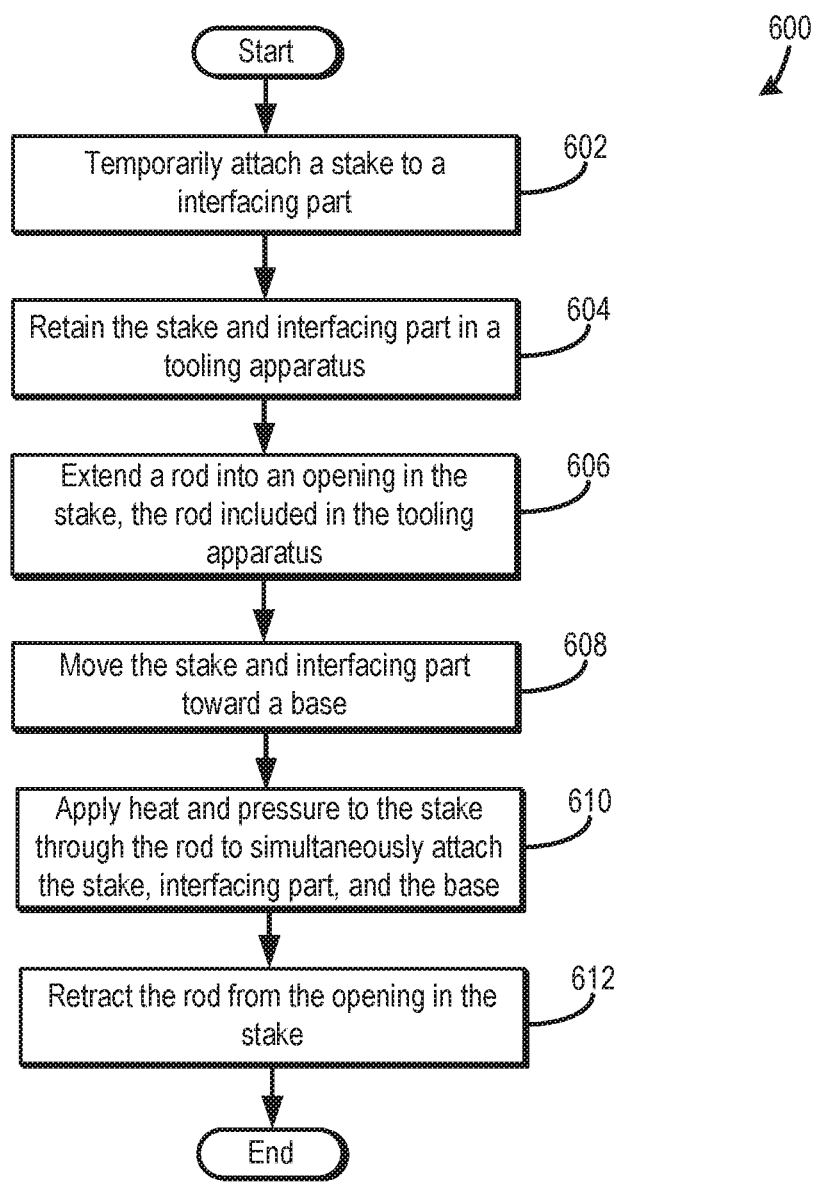

HEAT STAKES

CROSS REFERENCE TO RELATED APPLICATION

The present application claims priority to United Kingdom Application No. 1614545.0, filed on Aug. 26, 2016. The entire contents of the above-referenced application are hereby incorporated by reference in its entirety for all purposes.

FIELD

The present description relates improvements in or relating to the provision of heat stakes and, in particular, to the attachment of heat stakes and their interfacing parts onto surfaces.

BACKGROUND/SUMMARY

It may be necessary to attach together two interfacing parts. One method of achieving this is via the provision of a heat stake, as illustrated in prior art FIGS. 1A and 1B. FIGS. 1A and 1B show a base 1 provided with a stake 2 and an interfacing part 3. The action of heat staking joins the interfacing part 3 to the base 1. This occurs when a tool 4 is brought into contact with the stake 2 which deforms thus holding the base 1 and the interfacing part 3 together. The tool 4 may operate by any one of a number of different methods, including vibration. In order for this technique to be effective the stake 2 is manufactured as an integral part of the base 1. However, there are some applications and locations where parts could be effectively joined through heat staking, but the base cannot be manufactured with an integral stake.

It is against this background that the present invention has arisen. To solve at least some of the aforementioned problems the inventors have provided an apparatus configured to enable the staking of an interfacing part to a base. The apparatus including a retainer configured to convey a stake and the interfacing part to the base. The apparatus is also configured to provide a heat and/or vibration to effect the simultaneous attachment of the stake to the base and the interfacing part to the base. The apparatus enables the stake to be attached to the base simultaneously with the interfacing part being attached to the base. This is very useful in circumstances where the nature or orientation of the base prevents the stake from being formed integrally with the base. For example, where the stake would need to extend perpendicular to the extraction direction of the molding tool so the stake cannot be formed at that location. In one example, the stake may be temporarily attached to the interfacing part whilst being conveyed by the apparatus toward the base. In this way, the stake and interfacing part may be temporarily connected to enable efficient transport of the stake and interfacing part towards the base, prior to attaching the interfacing part to the base. Additionally, temporarily attaching the stake to the interfacing part enables the stake and interfacing part to be accurately guided toward the base in a coordinated manner.

In another example, the stake may be hollow and the apparatus may further include a metal rod configured to extend through the stake. The metal rod may prevent the stake from flexing and may also act as a thermal guide during the attachment process. The metal rod may protrude from the apparatus to a position adjacent to, but not touching, the base, during the attachment process. This allows the rod to guide the stake and ensure that it is correctly positioned and does not flex. The metal rod may also help heat to be transferred through the length of the rod to the stake. Consequently, the interfacing part may be accurately and robustly coupled to the base via a stake.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A to 3C show a first embodiment of the apparatus for heat staking;

FIGS. 4A to 4C show a second embodiment of the apparatus for heat staking;

FIG. 5 shows a method for constructing interfacing components;

FIG. 6 shows another method for constructing interfacing components; and

FIGS. 2-4C and 7 are shown approximately to scale. However, other relative dimensions may be used in other embodiments.

DETAILED DESCRIPTION

Figure 1A:
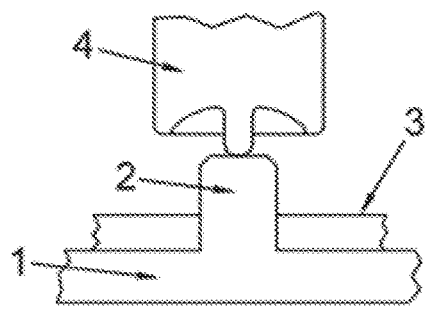
FIGS. 1A and 1B show a prior art apparatus for heat staking.
Figure 1B:
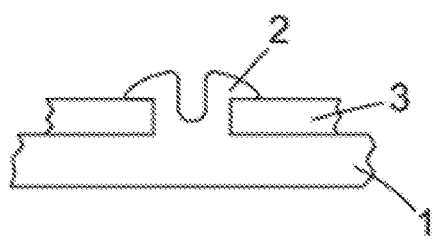

An apparatus for attaching two components to each other through a staking process is described herein. In one example, an apparatus (e.g., staking tool) may include a retainer configured to convey a stake and the interfacing part to the base. The apparatus is also configured to provide a heat and/or vibration to effect the simultaneous attachment of the stake to the base and the interfacing part to the base. In this way, the apparatus enables the stake to be attached to the base simultaneously with the interfacing part being attached to the base. This is very useful in circumstances where the nature or orientation of the base means that the stake cannot be formed integrally with the base. For instance, a situation may arise where the stake would need to extend perpendicular to the extraction direction of the molding tool so the stake cannot be formed at that location. In one example, the stake may be temporarily attached to the interfacing part whilst being conveyed by the apparatus toward the base. In this way, the stake and interfacing part may be temporarily attached while they are brought into contact with the base.

In another example, the stake may be hollow and the apparatus may further include a metal rod configured to extend through the stake. The metal rod may prevent the stake from flexing and may also act as a thermal guide during the attachment process. The metal rod may protrude from the apparatus to a position adjacent to, but not touching, the base, during the attachment process. This allows the rod to guide the stake and ensures that it is correctly positioned and does not flex during the manufacturing process. Using the metal rod also assists in heat transfer throughout the length of the rod, thereby improving heat distribution in the stake during the staking process.

During the attachment process the application of heat, pressure or a combination of heat and pressure causes the stake to melt and adhere the interfacing part to the base. As a result, of the friction, pressure and/or heat, the stake will spread laterally between the base and the interfacing part. Consequently, the stake's breadth in a direction orthogonal to the base may diminish during the attachment process. Therefore, in order to prevent the metal rod from coming into contact with the base, the metal rod may be configured to retract into the apparatus during the attachment process, in one example.

Furthermore, in one example, a method of staking an interfacing part to a base may be provided. The method includes simultaneously attaching a stake and the interfacing part to the base.

In one example, the stake may be temporarily attached to the interfacing part. The temporary attachment may be effected by an adhesive and/or by an interference fit, in some instances. This allows the stake to be introduced into the staking equipment. The stake and interfacing part are therefore cooperatively moved to a desired location on the base, which may be positioned within a vehicle. Specifically in one example, the stake and interfacing part may be brought into contact with the base. The attachment of the stake and the interfacing part to the base may occur through a combination of friction, heat, and/or pressure melting the stake.

Figure 2:
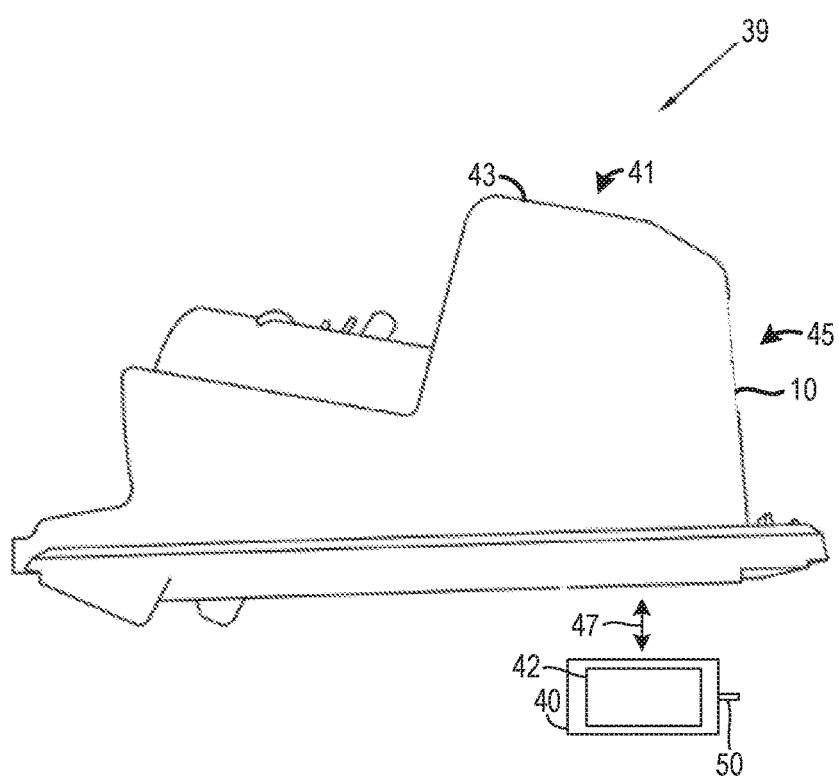
FIG. 2 shows an apparatus for staking an interfacing part to a component.

FIG. 2 shows an embodiment of a component 39 and apparatus 40 (e.g., staking tool). In the depicted example, the component 39 is an air cleaner (e.g., air cleaner lid). In such an example, the air cleaner lid may attach to an air cleaner body having a filter positioned therein. However, other suitable components (e.g., vehicle components) have been contemplated. The component 39 includes a base 10. The base 10 forms a portion of a housing 41 of the component 39. Additionally, the housing 41 is shown including an upper wall 43 and a side wall 45 that includes the base 10.

The apparatus 40 is configured to stake an interfacing part 30, shown in FIGS. 3A-4C, to the base 10. The apparatus 40 includes a retainer 42 which is configured to hold a stake 20 and the interfacing part 30, shown in FIGS. 3A-4C. In one example, the retainer 42 may include a separate retainer device for the stake 20 and the interfacing part 30. Alternatively, there may be a single retainer that holds the interfacing part and the stake which are temporarily attached to one another. The temporary attachment of the stake 20 to the interfacing part 30 may be effected via the use of an adhesive and/or through the provision of an interference fit between the two parts. Continuing with FIG. 2, the apparatus 40 includes a rod 50. The rod 50 is configured to extend and mate with a stake during the manufacturing process. The rod 50 may extend and retract in a direction perpendicular to the directions of travel, indicated via arrows 47, of the apparatus 40 during insertion and removal. However, other relative orientations between the direction of travel of the apparatus and the direction of extension/retraction of the rod 50 have been contemplated. For instance, the rod 50 may extend at a non-straight angle with regard to the direction of travel of the apparatus 40.

FIGS. 3A to 3C show a cross section through the apparatus 40 in the vicinity of the stake 20 at three different stages (e.g., sequential stages) in the attachment process. As illustrated in FIG. 3A, the apparatus 40 has positioned the stake 20 and the interfacing part 30 above a base 10 to which the stake 20 and interfacing part 30 are to be attached. In one example, the apparatus 40 may move the stake 20 and interfacing part 30 along a length of the base 10 while the stake and interfacing part are in close proximity to the base. Consequently, the apparatus 40 may insert the stake 20 and the interfacing part 30 in a component with packaging restrictions, such as in an air cleaner, in one example.

The apparatus 40 is shown including a retainer 42 holding the stake 20 and the interfacing part 30. The retainer 42 may temporarily hold the stake 20 and interfacing part 30 while they brought towards the base 10.

A controller 100 is also shown in FIG. 3A. The controller 100 may be configured to command adjustment of the apparatus 40. Although the controller 100 and the apparatus 40 are depicted as separate components, the controller 100 and the apparatus 40 may be a single device sharing a common housing, in other examples. The controller 100 is shown FIG. 2 as a microcomputer, including microprocessor unit 102, input/output ports 104, an electronic storage medium for executable programs and calibration values shown as read-only memory chip 106 in this particular example, random access memory 108, keep alive memory 110, and a data bus.

Storage medium read-only memory 106 can be programmed with computer readable data representing instructions executable by processor 102 for performing the methods described below as well as other variants that are anticipated but not specifically listed. Exemplary methods are described with reference to FIGS. 5 and 6. It will be appreciated that the controller 100 may also control the apparatus 40, shown in FIGS. 3B, 4A, and 4B. As another example, the controller may make a logical determination (e.g., regarding a position of the apparatus 40) based on logic rules that are a function of the position of the apparatus with regard to the base 10. The controller may then generate a control signal that is sent to actuators in the apparatus 40.

A coupling mechanism 60 is shown in FIG. 3A. The coupling mechanism 60 may be configured to apply friction, heat, and/or pressure to the stake 20. Specifically, in one example, the coupling mechanism 60 may be configured to vibrate the stake 20 to generate heat and/or apply direct heat to the stake 20. However, other techniques for generating heat via the coupling mechanism 60 have been contemplated. The coupling mechanism 60 may include an actuator 62 to enable selective application of friction, heat, and/or pressure to the stake 20. Moreover, it will be appreciated that the coupling mechanism 60 may receive commands from the controller 100 to perform the aforementioned functions.

The stake 20 is shown extending through an opening 64 in the interfacing part 30. In one example, the stake 20 may be press fit into the opening 64. In this way, the stake 20 may be temporarily attached to the interfacing part 30. FIG. 3A also shows the stake 20 temporarily attached to the interfacing part 30 via a layer of adhesive 66. However in other examples, the stake 20 may be temporarily attached to the interfacing part 30 via an adhesive material or an interference fit.

FIG. 3B shows the relative position of the base 10, stake 20, and interfacing part 30 following the application of friction, heat, and/or pressure via the coupling mechanism 60 which results in the melting and subsequent deformation of the stake 20. The application of friction, heat, and/or pressure to the stake 20 from the coupling mechanism 60 is indicated via arrow 68. In one example, the coupling mechanism 60 may be configured to vibrate the stake 20 to generate heat to melt the stake and portions of the interfacing part 30 and the base 10. However in other examples, the coupling mechanism 60 may be configured to directly generate heat and apply the heat to the stake 20.

During the manufacturing process, the stake 20 comes into contact with and attaches to the base 10 and deforms into the space between the base 10 and the interfacing part 30 in order to attach the interfacing part 30 to the base 10. As shown, the deformation of the stake 20 may form a recess 70 in the stake 20 that mates with a section of the interfacing part 30. As shown, the longitudinal length of the stake 20 is decreased during the deformation. A longitudinal axis and a lateral axis are provided for reference in FIG. 3B. Additionally, during the application of the heat and the pressure to the plastic in the stake 20 may be welded with the plastic in the interfacing part 30 and the base 10, in one example. In such an example, the base 10 may be formed from a plastic material. Likewise, the stake 20 and/or interfacing part 30 may also be formed from a plastic material. In one specific example, each of the base 10, stake 20, and interfacing part 30 may be formed from a similar plastic material. However in other examples, the base 10, stake 20, and/or interfacing part 30 may be formed from different plastic material. Exemplary plastic materials that may form the base 10, stake 20, and/or interfacing part 30 include Polyphenylene, Polycarbonate, Polystyrene, etc. Additionally, in some examples, a vibrational frequency used to weld the plastic material may be between 100 Hz and 200 Hz and may be selected based on the type of plastic. Moreover, the amplitude of the vibration used to weld the plastic material may vary between 1 mm and 4 mm, in some examples. It will be appreciated that a lower vibrational amplitude may require a higher vibration frequency to provide desired welding characteristics, in one example.

Further, in one example, the apparatus 40 may directly apply heat as well as vibration to the stake 20. In such an example, when the heat directly applied by the apparatus 40 to the stake 20 is increased the amplitude and/or frequency of the vibration applied by the apparatus to the stake may be correspondingly decreased or vice-versa. Continuing with this example, the direct heat applied by the apparatus 40 may not exceed a glass transition point of the material of the stake (e.g., 147 degrees Celsius for Polycarbonate). It will be appreciated that the temperature applied by the apparatus may be kept under the glass transition point by a safe margin, in some examples.

FIG. 3C shows the completed part once the apparatus 40, shown in FIGS. 3A and 3B, has been removed. The base 10 is attached firmly through the stake 20 to the interfacing part 30. Specifically in one example, the base 10, stake 20, and interfacing part 30 may be joined via plastic welding, as previously discussed.

An interior section 72 of a vehicle component (e.g., air cleaner) is also shown in FIG. 3C. When the vehicle component is an air cleaner in an intake system the interfacing part 30 may be a base of a hydrocarbon trap. Specifically in such an example, base 10 shown in FIG. 3C may be the side of a housing of an air cleaner. In such an example, intake air may flow through the interior section 72 when an engine in the vehicle is implementing combustion operation. However, the interior section 72 may be a section of another suitable component, in other examples.

FIGS. 4A to 4C show a second embodiment of the apparatus 40, stake 20, interfacing part 30, and base 10 that differs from the embodiment shown in FIGS. 3A to 3C by the addition of a rod 50. The apparatus 40 includes the rod 50 that protrudes through the stake 20 in an extended position, shown in FIGS. 4A and 4B, in order to guide the stake 20 into a desired (e.g., optimum) position. In one example, the rod 50 may be metal so that it will also guide heat through the stake 20 to aid the melting of the stake 20, interfacing part 30, and base 10. However, other rod materials have been contemplated.

The rod 50 extends from the apparatus 40 through an opening 74 in the hollow core of the stake 20. As will be apparent from FIG. 4B, the rod 50 is partially retracted from the stake 20 during the attachment process in order to allow the base 10 and interfacing part 30 to move towards one another. The apparatus 40 includes a rod adjustment mechanism 76 coupled to the rod 50 and configured to extend and retract the rod 50. Arrows 78 indicate the direction of extension and retraction of the rod 50.

FIGS. 4A and 4B show the apparatus 40 again including the retainer 42 configured to hold the stake 20 and the interfacing part 30 as well as convey the stake and interfacing part toward the base 10. In one example, the apparatus 40 may transport the stake 20 and interfacing part in a lateral direction. Lateral and longitudinal axes are provided for reference, in FIG. 4A.

FIG. 4C shows the stake 20 with the rod 50, shown in FIG. 4B, removed from the opening 74 in the stake. As shown, the stake 20 is deformed to mate with the interfacing part 30 and is coupled to the base 10. For instance, the stake 20 and the base 10 may be coupled via a fused joint generated through a plastic welding technique.

As shown in FIG. 4C, the interfacing part 30 is spaced away from the base 10 after the rod is retracted. However, in other examples the interfacing part 30 may be in face sharing contact with the base 10 after heat and pressure are applied to the stake via the rod.

The apparatus described herein is applicable in various situations where the materials used or the manufacturing constraints make the deployment of a standard heat stake impractical. One exemplary application for the heat staking technique described herein is a vehicle hydrocarbon trap which needs to be attached within an air cleaner. In such an example, due to the limited space available it may not possible to fit the hydrocarbon trap on the roof of the air cleaner. Because heat stakes could only be manufactured into the lid of the air cleaner, this was the only previous viable position for the hydrocarbon trap. However, in one instance, due to the space constraints within the vehicle the only viable space for locating the hydrocarbon trap was on the side of the air cleaner. The method and apparatus described herein make heat staking the hydrocarbon trap to the side of the air cleaner possible. However, the heat staking method and apparatus may be used in other applications.

FIG. 5 shows a method 500 for staking an interfacing part to a base. The method 500 may be implemented by the apparatus (e.g., staking tool) described above with regard to FIGS. 2-4C to assemble the stake, interfacing part, and the base. Instructions for carrying out method 500 and the remainder of the methods described herein may be executed by a controller based on instructions stored on a memory of the controller. The controller may employ actuators in a staking tool to manufacture two adjoined parts (e.g., air cleaner housing and hydrocarbon trap) in a component such as an air cleaner, for instance.

At 502 the method includes simultaneously attaching a stake and an interfacing part to a base. Simultaneously, attaching the stake to the interfacing part to the base may include steps 504-510.

At 504 the method includes temporarily attaching the stake to the interfacing part. Temporarily attaching the stake to the interfacing part may include adhesively attaching the stake to the interfacing part, in one example. Additionally or alternatively, attaching the stake to the interfacing part may include press fitting the stake to the interfacing part. It will be appreciated that press fitting the aforementioned parts is achieved by fastening the two parts together via friction.

At 506 the method includes bringing the stake and interfacing part into contact with the base. Bringing the stake and interfacing part into contact with the base may include moving a tool with the stake and the interfacing part attached thereto in a direction along a surface of the base, in one example.

At 508 the method includes applying heat and pressure to the stake, interfacing part, and base. Applying heat and pressure to the aforementioned components may include vibrating a rod inserted in the stake to generate heat, in one example. Next at 510 the method includes detaching the tool from the stake and interfacing part. Detaching the tool from the stake and interfacing part may include retracting the rod from an opening in the stake. The technical effect of the method for simultaneously attaching the stake to the interfacing part and the base is an increase in manufacturing efficiency of a vehicle component with spatial constraints.

FIG. 6 shows a method 600 for manufacturing a vehicle component. The method may be used to manufacture the component described above that includes the stake, interfacing part, and base. However, it will be appreciated that the method 600 may be used to manufacture other vehicle components including a stake, interfacing part, and base, in other instances.

At 602 the method includes temporarily attaching a stake to an interfacing part. Temporarily attaching the stake to the interfacing part may include press fitting the stake into an opening in the interfacing part and/or adhesively bonding the stake to the interfacing part. In this way, the stake and the interfacing part may be held together during preliminary steps in the manufacturing process.

At 604 the method includes retaining the stake and interfacing part in a tooling apparatus. The stake and the interfacing part may be held in the tooling apparatus via one or more retainers configured to temporarily hold the stake and interfacing part.

At 606 the method includes extending a rod into an opening in the stake, the rod included in the tooling apparatus. The rod enables the stake and interfacing part to be reinforced while vibration is applied to the stake to reduce the likelihood (e.g., prevent) unwanted movement of the stake and interfacing part, during manufacturing.

At 608 the method includes moving the stake and interfacing part toward a base. As previously discussed, the base may be included in a housing of an air cleaner. In such an example, the interfacing part may be a hydrocarbon trap. Additionally in one example, the stake and interfacing part may be moved in a non-straight (e.g., perpendicular) direction with regard to the direction of extension of the rod. In this way, the tooling apparatus can be used in components with spatial restrictions.

At 610 the method includes applying heat and pressure to the stake through the rod to simultaneously attach the stake, interfacing part, and the base. In one example, the stake is deformed after the application of heat and pressure. The deformation of the stake may cause the stake to mate with the interfacing part and form a fused joint with both the base as well as the interfacing part. Next at 612 the method includes retracting the rod from the opening in the stake. In one example, the interfacing part is spaced away from the base after the rod is retracted. Method 600 enables a staking tool to efficiently join an interfacing part and base in a component with spatial constraints.

Figure 7:
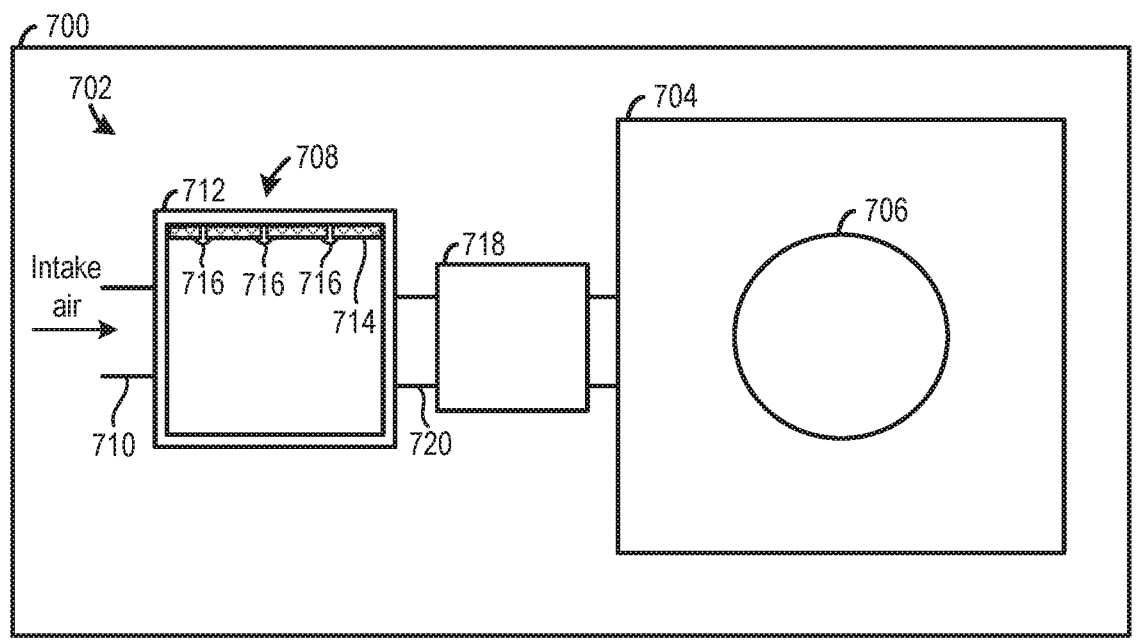
FIG. 7 shows an example component in a vehicle.

FIG. 7 shows an exemplary operating environment for the vehicle component described above with regard to FIGS. 2-6. In FIG. 7 the vehicle component is an air cleaner. However, it will be appreciated that the manufacturing techniques described herein may be used to manufacture other components that include a stake, interfacing part, and base attached to one another via plastic welding.

FIG. 7 shows a vehicle 700 including an intake system 702 and engine 704. The intake system 702 provides air to a cylinder 706 in the engine 704. The engine 704 may be configured to carry out a 4-stroke combustion process (i.e., intake, compression, power, and exhaust strokes) in the cylinder 706.

The intake system 702 includes an air cleaner 708 receiving intake air from an intake conduit 710. The air cleaner 708 includes a housing 712 with a hydrocarbon trap 714 attached thereto via stakes 716. The hydrocarbon trap 714 may be configured to store hydrocarbon vapors (e.g., fuel vapor), to reduce evaporative emissions. The air cleaner 708 is positioned upstream of a throttle 718 positioned in a downstream air conduit 720.

It will be appreciated that the air cleaner 708, hydrocarbon trap 714, and stakes 716, shown in FIG. 7, may be examples of the base 10, interfacing part 30, and stake 20, shown in FIGS. 3A-4C. However, other vehicle components may be attached together using the staking technique described herein.

FIGS. 2-4C and 7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will be further described in the following paragraphs. In one aspect, an apparatus configured to enable the staking of an interfacing part to a base is provided. The apparatus comprises a retainer configured to convey a stake and the interfacing part to the base, the apparatus configured to provide at least one of a heat and vibration to effect the simultaneous attachment of the stake to the base and the interfacing part to the base.

In another aspect, a method of staking an interfacing part to a base is provided. The method comprises simultaneously attaching a stake and the interfacing part to the base.

In yet another aspect, a method for manufacturing a vehicle component is provided. The method comprises temporarily attaching a stake to an interfacing part, retaining the stake and interfacing part in a tooling apparatus, extending a rod into an opening in the stake, the rod included in the tooling apparatus, moving the stake and interfacing part toward a base, applying heat and pressure to the stake through the rod to simultaneously attach the stake, interfacing part, and base, and retracting the rod from the opening in the stake.

In any of the aspects or combinations of the aspects, the stake may be temporarily attached to the interfacing part whilst being conveyed by the apparatus.

In any of the aspects or combinations of the aspects, the stake may be hollow.

In any of the aspects or combinations of the aspects, the apparatus may further comprise a metal rod configured to extend through the stake.

In any of the aspects or combinations of the aspects, the metal rod may be configured to protrude from the apparatus.

In any of the aspects or combinations of the aspects, the metal rod may be configured to retract into the apparatus.

In any of the aspects or combinations of the aspects, the stake may be temporarily attached to the interfacing part.

In any of the aspects or combinations of the aspects, the temporary attachment may be effected by an adhesive.

In any of the aspects or combinations of the aspects, the temporary attachment may be effected by an interference fit.

In any of the aspects or combinations of the aspects, the stake and interfacing part may be brought into contact with the base during the simultaneous attachment of the stake and interfacing part to the base.

In any of the aspects or combinations of the aspects, the attachment of the stake and the interfacing part may occur through a combination of heat and pressure to melt the stake.

In any of the aspects or combinations of the aspects, the stake, interfacing part, and base each may include a plastic material.

In any of the aspects or combinations of the aspects, the rod may include metal.

In any of the aspects or combinations of the aspects, the vehicle component may be an air cleaner in an intake system.

In any of the aspects or combinations of the aspects, the base may be a housing of the air cleaner and the interfacing part may be a hydrocarbon trap.

In any of the aspects or combinations of the aspects, the stake may be deformed after the application of heat and pressure and the interfacing part may be spaced away from the base after the rod is retracted.

In any of the aspects or combinations of the aspects, the rod extends and retracts in directions that are not parallel to a direction of movement of the stake and interfacing part toward the base.

In any of the aspects or combinations of the aspects, temporarily attaching the stake to the interfacing part may include press fitting the stake into an opening in the interfacing part.

Note that the example control and estimation routines included herein can be used with various tooling apparatus, engine, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to other types of engines (V-6, I-4, I-6, V-12, opposed 4, etc.,), vehicle systems, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It will further be appreciated by those skilled in the art that although the invention has been described by way of example with reference to several embodiments it is not limited to the disclosed embodiments and that alternative embodiments could be constructed without departing from the scope of the invention as defined in the appended claims.

The invention claimed is:

1. A method of staking an interfacing part to a base, the method comprising:
   simultaneously attaching a stake and an interfacing part to the base, wherein the stake is temporarily attached to the interfacing part, and
   passing a rod through the stake after simultaneously attaching the temporarily attached stake and interfacing part to the base.

2. A method of staking an interfacing part to a base, the method comprising:
   temporarily attaching a stake to the interfacing part,
   then, simultaneously attaching the temporarily attached stake and interfacing part to the base, and
   passing a rod through the stake after simultaneously attaching the temporarily attached stake and interfacing part to the base.

3. The method of claim 2, wherein the temporary attachment is effected by an adhesive.

4. The method of claim 2, wherein the temporary attachment is effected by an interference fit.

5. The method of claim 1, wherein the stake and the interfacing part are brought into contact with the base during a simultaneous attachment of the stake and the interfacing part to the base.

6. The method of claim 1, wherein the attachment of the stake and the interfacing part occurs through a combination of heat and pressure to melt the stake.

7. A method for manufacturing a vehicle component, comprising:
   temporarily attaching a stake to an interfacing part;
   retaining the stake and the interfacing part in a tooling apparatus;
   extending a rod through an opening in the stake, the rod included in the tooling apparatus;
   moving the stake and the interfacing part toward a base;
   applying heat and pressure to the stake through the rod to simultaneously attach the stake, the interfacing part, and the base; and
   retracting the rod from the opening in the stake.

8. The method of claim 7, wherein the stake, the interfacing part, and the base each include a plastic material.

9. The method of claim 7, wherein the rod includes metal.

10. The method of claim 7, wherein the vehicle component is an air cleaner in an intake system.

11. The method of claim 10, wherein the base is a housing of the air cleaner and the interfacing part is a hydrocarbon trap.

12. The method of claim 7, wherein the stake is deformed after the application of heat and pressure and the interfacing part is spaced away from the base after the rod is retracted.

13. The method of claim 7, wherein the rod extends and retracts in directions that are not parallel to a direction of movement of the stake and the interfacing part toward the base.

14. The method of claim 7, wherein temporarily attaching the stake to the interfacing part includes press fitting the stake into an opening in the interfacing part.

15. The method of claim 2, wherein the stake passes through the interfacing part from a first side of the interfacing part to a second side of the interfacing part.

16. The method of claim 15, wherein the stake is in face sharing contact with the first side of the interfacing part, and the base is positioned on the second side of the interfacing part.

17. The method of claim 2, further comprising applying heat or vibration to the stake after simultaneously attaching the temporarily attached stake and interfacing part to the base.

18. The method of claim 17, wherein applying the heat or vibration deforms the stake forming a recess that mates with the interfacing part.

19. The method of claim 2, further comprising applying heat through the rod.

* * * * *